United States Patent [19]
Huskins

[11] B 3,914,206
[45] Oct. 21, 1975

[54] TERPOLYMER-BUTADIENE-CARBORANYL METHACRYLATE, AND ACRYLIC ACID

[75] Inventor: Chester W. Huskins, Huntsville, Ala.

[73] Assignee: The United States of America as represented by the Secretary of the Army, Washington, D.C.

[22] Filed: Mar. 30, 1970

[21] Appl. No.: 24,018

[44] Published under the Trial Voluntary Protest Program on January 28, 1975 as document no. B 24,018.

[52] U.S. Cl. ............. 260/80.7; 149/19.5; 149/19.9; 149/22; 149/44; 260/83.5
[51] Int. Cl.$^2$ .......................................... C07F 5/02
[58] Field of Search ............. 149/22; 260/83.5, 80.7

[56] References Cited
UNITED STATES PATENTS
3,183,216  5/1965  Cohen et al. ..................... 260/83.5

*Primary Examiner*—Leland A. Sebastian
*Attorney, Agent, or Firm*—Nathan Edelberg; Robert P. Gibson; Jack W. Voigt

[57] ABSTRACT

The terpolymer comprised of butadiene, carboranyl methacrylate, and acrylic acid is disclosed along with a method for preparation. The terpolymer is useful as a combination binder and catalyst for solid propellants. The propellant compositions containing the terpolymer yield a wide range of burning rates which are proportional to the carboranyl methacrylate contents of the propellant compositions. The terpolymer with carboxyl functionality is prepared by emulsion polymerization using a quaternary ammonium chloride such as benzylcetyldimethylammonium chloride as the emulsifier, azo-bis-isobutyronitrile as the initiator, and dodecylmercaptan as the chain terminating agent.

3 Claims, No Drawings

TERPOLYMER-BUTADIENE-CARBORANYL METHACRYLATE, AND ACRYLIC ACID

BACKGROUND OF THE INVENTION

Burning rates of solid propellants have been increased by introduction of additives. More recently carborane derivatives have been used as additives for the purpose of burning rate control. The additives, usually in the form of liquids, exhibit the inherent disadvantages characteristic of liquid additives such as loss by evaporation, and/or migration; such losses are detrimental to the finished propellant since the propellant would not, as a result of the described losses, be able to burn evenly to produce reliability needed for present day missiles and weaponry.

Polybutadienes, having carboxyl functionality or hydroxyl functionality, have been used as the binder constituent of solid propellants. The functional groups provide cross-linking sites which are connected during the curing or reaction phase while in the presence of the appropriate curing agent. Diisocyanates are well known curing agents for hydroxyl functionality binder constituents. Diaziridines, triaziridines, diepoxides, and triepoxides, and combinations of the same, are well known for use in curing binder constituents having carboxyl functionality.

A desirable combination would be to combine polybutadiene, a burning rate catalyst, and the functional group into a stable polymer.

An object of this invention is to provide a terpolymer (e.g., a polymer containing three monomeric units) for use as the binder and burning rate controller for solid propellants.

A further object is to provide a solid propellant composition which employs the terpolymer of this invention.

SUMMARY OF THE INVENTION

A terpolymer of butadiene, carboranyl methacrylate, and acrylic acid is prepared in an aqueous mixture by an emulsion polymerization process employing a quaternary ammonium chloride compound such as benzylcetyldimethylammonium chloride as the emulsifier, azo-bis-isobutyronitrile as the free radical type initiator, and dodecylmercaptan as the chain terminating agent. The stable terpolymer may be varied in carboranyl methacrylate content from about 15 to about 75 percent by weight of the terpolymer, in butadiene content from about 10 to about 80 percent by weight of the terpolymer, and in acrylic acid content from about 2 to about 20 percent by weight of the terpolymer.

The emulsion polymerization process employs a concentration of ingredients, based on a percent of the total weights of the three monomers specified generally as follows: the chain terminating agent up to about 10 percent of the monomer weights, the emulsifier up to about 6 percent of the monomer weights, and the initiator up to about 2 percent of the monomer weights. For lower molecular weight terpolymer, a higher percent chain terminating agent is used and likewise, when a higher molecular weight is desired, a lower percent of chain terminating agent is used. The aqueous solution ratio to reactants is from about 1 to 1 to about 2 to 1. A water solution yields a good emulsion wherein the polymerization takes place. The temperature range of the polymerization mixture may vary according to the particular systems used; however, a temperature in the range of about 50°C allows the polymerization to proceed smoothly and at a suitable rate for an average batch process.

The terpolymer of this invention is used with ammonium perchlorate oxidizer, powdered aluminum fuel, optional curatives and additives to yield propellant compositions having burning rates over the range from about 0.4 inches/second to about 3.5 inches/second. Propellant compositions of this invention contain from about 15 to about 30 percent terpolymer by weight of the propellant, aluminum powder from about 10 to about 20 percent by weight of the propellant composition, ammonium perchlorate oxidizer from about 50 to about 70 percent by weight of the propellant composition and optional additives for processing and curing the propellant (such as lecithin in an amount from about 0.2 to about 0.5 percent by weight, and special curatives up to a total of about 2 percent by weight of the other propellant ingredients).

DESCRIPTION OF THE PREFERRED EMBODIMENTS

The ingredients listed below are combined in a polymerization container equipped with agitation means, and temperature controlling and measuring means.

| Ingredients | Weight |
| --- | --- |
| Butadiene | 26.0 grams |
| Carboranyl methacrylate (CMA) | 6.0 grams |
| Dodecylmercaptan | 4.0 grams |
| Azo-bis-isobutyronitrile | 0.6 grams |
| Benzylcetyldimethylammonium Chloride | 2.0 grams |
| Acrylic Acid | 5.0 grams |
| Water | 60 milliliters |

The polymerization mixture of the above ingredients is placed in a water bath at 50°C. A shaking action or agitating action provides an emulsion wherein the polymerization is allowed to take place. Although the polymerization is essentially completed in a few hours, the polymerization mixture is separated after about 16 hours. Separation of the polymer is accomplished by pouring the polymerization mixture into a beaker, acidifying with hydrochloric acid, and then adding sufficient tetrahydrofuran (THF) to separate the polymer from the mixture. The polymer which is contained in the (THF) layer is separated by means of a separatory funnel. After drying the polymer, a yield (approaching 100% yield) was calculated on the basis of the weight of the ingredients used and the weight of the polymer recovered. The polymeric material was characterized by gel permeation chromatography and infrared measurements. The results show the presence of a terpolymer containing the monomers, carboranyl methacrylate, butadiene, and acrylic acid.

Samples of propellant using varying amounts of the terpolymer equivalent were prepared for burning rate comparisons. All propellants (including a standard propellant which contained a carboxy terminated polybutadiene binder) contained a blend of particle sized ammonium perchlorate (AP) containing substantially 36% by weight of 6 micron sized, 27% by weight of 17 micron sized, and 37% by weight of 200 micron sized. The type ammonium perchlorate selected is easily blended, and it provides a uniform burning rate and range of burning rates for testing. Table I sets forth propellant compositions A, B, and C containing the equivalent terpolymer (as binder) with 25% CMA, 50% CMA, and 75% CMA, respectively, along with blended AP, aluminum powder and lecithin. Composition D is the standard which contained carboxy-terminated polybutadiene binder (0% CMA).

TABLE I

| Composition | Ingredients | Percent by Weight |
|---|---|---|
| A | Terpolymer (25% CMA) | 19.7 |
|  | AP | 64.0 |
|  | Aluminum powder | 16.0 |
|  | Lecithin | 0.3 |
|  |  | 100.0 |
| B | Terpolymer (50% CMA) | 19.7 |
|  | AP | 64.0 |
|  | aluminum powder | 16.0 |
|  | Lecithin | 0.3 |
|  |  | 100.0 |
| C | Terpolymer (75% CMA) | 19.7 |
|  | AP | 64.0 |
|  | aluminum powder | 16.0 |
|  | Lecithin | 0.3 |
|  |  | 100.0 |
| D(standard) | Carboxy-terminated polybutadiene | 19.7 |
|  | AP | 64.0 |
|  | aluminum powder | 16.0 |
|  | Lecithin | 0.3 |
|  |  | 100.0 |

Compositions A, B, C, and D were packed into straws and burned. Burning rates at 1000 psia ranged from 0.25 in./sec. for a standard propellant with 0% CMA content, to 0.4 in./sec. for low concentrations (e.g., 25%) of CMA and to 3.5 in/sec. for high concentrations (e.g., 75%) of CMA in the terpolymer. The equivalent concentration of CMA in the propellant ranged from about 5% to about 15% since the terpolymer (propellant binder) made up about 20% by weight of the propellant composition in each composition A, B, and C.

The burning rate data set forth above indicates that the burning rates of the propellants of this invention increase with increased CMA content. The CMA content and burning rate of a propellant are proportional. Thus, when the CMA contents and burning rates are plotted on a graph, one can predict a burning rate for a particular CMA content.

The CMA content (and burning rate) of a propellant can be easily controlled by not only varying the CMA content of the terpolymer, but in addition by varying the amount of the terpolymer used in the finished propellant. Since the terpolymer can be used along with present conventional carboxy terminated (CTPB) binders or with polybutadiene acrylic acid copolymer (PBAA) binders, a wide variation in the number of compositions containing varying amounts of CMA are easily obtained. the many possible compositions provide a wide selection of propellants having burning rates at the desired level for a particular function.

Additional burning rate studies were carried out using a terpolymer (with 17% CMA content) made in accordance with this invention. The propellant containing 20% by weight of the terpolymer with the specified CMA content showed a burning rate of about 0.36 in./sec. at 1000 psi. Other propellant ingredients were as set forth for compositions A, B, and C above. Although blended AP, as specified, was selected for testing A, B, C, the propellant containing the 17% CMA terpolymer, and for comparison with a standard composition D, other types of AP may be used. For example, all AP with the same particle size, either course or fine particle size, or mixtures of the same, may be used.

The improvement in burning rate of a propellant containing the terpolymer binder over a standard containing the same type AP, but with carboxy terminated polybutadiene binder instead of the novel terpolymer, is likewise, proportional to the CMA content of the terpolymer and propellant.

The present day requirements of missiles having propellants with both lower and higher burning rates (e.g., such as for sustainer or booster charge of propellant) can be met with the terpolymer of this invention. The control of burning rates of propellants for use in rockets having several stages can be achieved with selected terpolymers of this invention. The terpolymers of this invention can be easily tailored to meet the requirements for propellant burning rates used for single stage rockets and other functions as well.

I claim:
1. A method of making a terpolymer comprised of the monomers consisting of carboranyl methacrylate, butadiene, and acrylic acid, said method comprising the completing of the process steps of combining and reacting a predetermined amount of said monomers together in an aqueous mixture containing a polymerization initiator, a chain terminating agent, and an emulsifier, said polymerization initiator being the free radical initiator azo-bis-isobutyronitrile, said chain terminating agent being dodecylmercaptan, and said emulsifier being the quaternary ammonium chloride compound, benzylcetyldimethyl ammonium chloride, said reacting allowed to proceed while under agitation action to form said terpolymer, and separating said terpolymer thus formed.

2. The method of claim 1 wherein said reaction is carried out at about 50° C for a period of time up to about 16 hours.

3. The product made by the method of claim 2 wherein said terpolymer is comprised of the monomer carboranyl methacrylate in amounts from about 15 to about 75 percent by weight of said terpolymer, the monomer butadient in amounts from about 10 to about 80 percent by weight of said terpolymer, and the monomer acrylic acid in amounts from about 2 to about 20 percent by weight of said terpolymer.

* * * * *